United States Patent
Sawamura

(10) Patent No.: US 11,829,825 B2
(45) Date of Patent: Nov. 28, 2023

(54) PORTABLE ELECTRONIC DEVICE, IC CARD AND PROGRAM

(71) Applicants: KABUSHIKI KAISHA TOSHIBA, Tokyo (JP); Toshiba Infrastructure Systems & Solutions Corporation, Kawasaki (JP)

(72) Inventor: Satoshi Sawamura, Yokohama (JP)

(73) Assignees: KABUSHIKI KAISHA TOSHIBA, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 17/592,582

(22) Filed: Feb. 4, 2022

(65) Prior Publication Data

US 2022/0156546 A1    May 19, 2022

Related U.S. Application Data

(63) Continuation of application No. PCT/JP2020/032860, filed on Aug. 31, 2020.

(30) Foreign Application Priority Data

Sep. 2, 2019  (JP) ................. 2019-159612

(51) Int. Cl.
*G06K 19/073*    (2006.01)
(52) U.S. Cl.
CPC ............... *G06K 19/07354* (2013.01)
(58) Field of Classification Search
CPC .......... G06K 19/07354; G06K 19/0718; G06F 21/32
See application file for complete search history.

(56) References Cited

U.S. PATENT DOCUMENTS

| | | | |
|---|---|---|---|
| 11,409,854 B2* | 8/2022 | Andorko | G06V 40/197 |
| 2002/0188855 A1 | 12/2002 | Nakayama et al. | |

(Continued)

FOREIGN PATENT DOCUMENTS

| | | |
|---|---|---|
| EP | 1865442 A2 | 12/2007 |
| EP | 3229516 A1 | 10/2017 |

(Continued)

OTHER PUBLICATIONS

International Search Report dated Nov. 24, 2020 in PCT/JP2020/032860, filed on Aug. 31, 2020, 2 pages.

(Continued)

*Primary Examiner* — Seung H Lee
(74) *Attorney, Agent, or Firm* — Maier & Maier, PLLC

(57) ABSTRACT

According to an embodiment, a portable electronic device that executes a command from a host device includes a sensor and a processor. The sensor acquires biometric information. The processor causes the sensor to acquire first biometric information for generating a template used for authentication, and after the first biometric information is acquired, causes the sensor to acquire second biometric information used for generating the template. Where the similarity between the first biometric information and the second biometric information exceeds a first threshold value, the processor outputs a signal indicating that the second biometric information is inappropriate for use as biometric information for generating the template.

20 Claims, 3 Drawing Sheets

(56) References Cited

U.S. PATENT DOCUMENTS

| | | |
|---|---|---|
| 2008/0212846 A1 | 9/2008 | Yamamoto et al. |
| 2016/0132711 A1* | 5/2016 | Setterberg .............. G06V 40/50 382/124 |
| 2016/0247013 A1 | 8/2016 | Johansson |
| 2017/0277935 A1 | 9/2017 | Kao et al. |

FOREIGN PATENT DOCUMENTS

| | | |
|---|---|---|
| JP | 1-131978 A | 5/1989 |
| JP | 11-312225 A | 11/1999 |
| JP | 2000-182025 A | 6/2000 |
| JP | 2003-16450 A | 1/2003 |
| JP | 2003-85149 A | 3/2003 |
| JP | 2003-162705 A | 6/2003 |
| JP | 2006-72540 A | 3/2006 |

OTHER PUBLICATIONS

Extended European Search Report dated Jun. 14, 2023, in corresponding European Application No. 20861858.7, 6 pages.

* cited by examiner

PORTABLE ELECTRONIC DEVICE, IC CARD AND PROGRAM

CROSS REFERENCE TO RELATED APPLICATIONS

This application is a Continuation Application of PCT Application. No. PCT/JP2020/032860, filed Aug. 31, 2020 and based upon and claiming the benefit of priority from Japanese Patent Application No. 2019-159612, filed Sep. 2, 2019, the entire contents of all of which are incorporated herein by reference.

FIELD

Embodiments described herein relate generally to a portable electronic device, an IC card and a program.

BACKGROUND

Some portable electronic devices, such as IC cards, acquire biometric information such as fingerprint images through sensors or the like in order to generate authentication data used for biometric authentication. Such portable electronic devices may generate authentication data, based on a plurality of biometric information.

If a user keeps touching a sensor with a finger or the like, a conventional portable electronic device acquires a plurality of identical biometric information. In such a case, the portable electronic device cannot properly generate authentication data.

CITATION LIST

Patent Literature

Patent Literature 1: Jpn. Pat. Appln. KOKAI

SUMMARY

In order to solve the above problem, there are provided a portable electronic device, an IC card and a program capable of effectively acquiring a plurality of biometric information.

According to an embodiment, a portable electronic device that executes a command from a host device includes a sensor and a processor. The sensor acquires biometric information. The processor causes the sensor to acquire first biometric information for generating a template used for authentication, and after the first biometric information is acquired, causes the sensor to acquire second biometric information used for generating the template. Where the similarity between the first biometric information and the second biometric information exceeds a first threshold value, the processor outputs a signal indicating that the second biometric information is inappropriate for use as biometric information for generating the template.

DETAILED DESCRIPTION

A description will now be given of embodiments with reference to the accompanying drawings.

First Embodiment

First, a description will be given of the first embodiment.

The IC card according to the embodiment performs an authentication process using an image of a fingerprint (fingerprint image) acquired from the user. That is, the IC card performs the authentication process by comparing the acquired fingerprint image with pre-registered authentication data (template).

The IC card generates a template by acquiring a fingerprint image from the user by use of a sensor installed in the IC card. To generate the template, the IC card acquires a fingerprint image a number of times from the same finger. The IC card generates a template based on the acquired plurality of fingerprint images and registers it therein.

Figure 1:
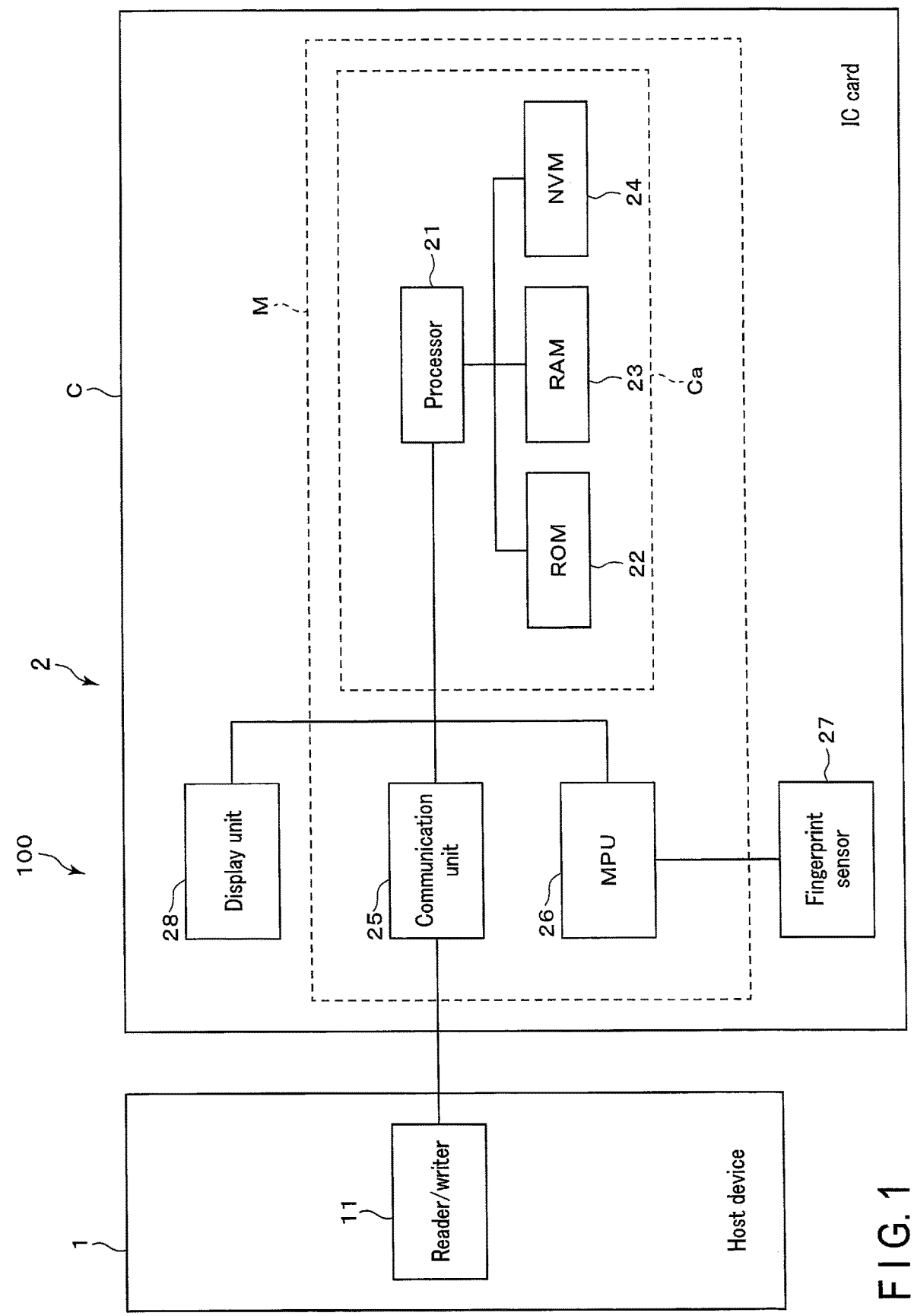
FIG. 1 is a block diagram illustrating a configuration example of an IC card processing system according to a first embodiment.

FIG. 1 illustrates a configuration example of the IC card processing system 100 according to the embodiment. As shown in FIG. 1, the IC card processing system 100 includes a host device 1 and an IC card 2 (portable electronic device). The host device 1 is communicably coupled to the IC card 2. The IC card processing system 100 may include a configuration as required in addition to the configuration shown in FIG. 1; alternatively, a specific configuration may be removed from the IC card processing system 100.

The host device 1 controls the entire IC card processing system 100. The host device 1 is coupled to the IC card 2 either in a contact manner or in a non-contact manner. The host device 1 activates the IC card 2 by supplying electric power to the IC card 2. In addition, the host device 1 causes the IC card 2 to execute various operations by transmitting various commands to the IC card 2.

In this example, the host device 1 transmits a command for registering a template to the IC card 2. That is, the host device 1 causes the IC card 2 to acquire a plurality of fingerprint images, generate a template based on the plurality of fingerprint images, and store the generated template.

The host device 1 includes a reader writer 11 and the like.

The reader/writer 11 is an interface device for transmitting/receiving data to/from the IC card 2. The reader/writer 11 is an interface complying with the communication method of the IC card 2. For example, where the IC card 2 is a contact type IC card, the reader/writer 11 is composed of a contact interface that is to be coupled to the contact portion of the IC card 2 physically and electrically.

Where the IC card 2 is a non-contact type IC card, the reader/writer 11 is composed of an antenna, a communication control unit, etc. that are used for wireless communications with the IC card 2. The reader/writer 11 is configured to perform power supply, clock supply, resetting control, and data transmission/reception with reference to the IC card 2.

With such functions, the reader/writer 11 supplies power to the IC card 2, activates (starts) the IC card 2, supplies clocks, performs resetting control, transmits various commands, and receives responses to the transmitted commands, under the control of the host device 1.

The IC card 2 operates according to commands supplied from the host device 1. The IC card 2 transmits responses to the commands to the host device 1.

The IC card 2 includes a card-shaped casing C made of plastic or the like. The IC card 2 includes a module M incorporated in the casing C, a fingerprint sensor 27 and a display unit 28. The module M is integrally formed, with an IC chip Ca, a communication unit 25 and an MPU 26 coupled thereto, and is embedded in the casing C of the IC card 2.

As shown in FIG. 1, the IC card 2 includes the module M, the fingerprint sensor 27, the display unit 28, etc. The module M includes the IC chip Ca, the communication unit 25, the MPU 26, etc. The IC chip Ca includes a processor 21, a ROM 22, a RAM 23, an NVM 24, etc. The processor 21 is coupled to the ROM 22, the RAM 23, the NVM 24, the communication unit 25, the MPU 26 and the display unit 28, via a data bus or the like. The MPU 26 is coupled to the fingerprint sensor 27 via a data bus or the like.

The IC card 2 may include a configuration as required, in addition to the configuration shown in FIG. 1, or a specific configuration may be removed from the IC card 2.

The processor 21 functions as a control unit that controls the entire IC card 2. The processor 21 performs various processes, based on the control programs and control data stored in the ROM 22 or the NVM 24. For example, the processor 21 executes various processes in accordance with the operation control of the IC card 2 or the operation mode of the IC card 2, by executing the programs stored in the ROM 22.

For example, the processor 21 may be a processor that realizes control and information processing of each section in the IC card 2 by executing a program.

It should be noted that some of the various functions which the processor 21 realizes by executing the program may be realized by a hardware circuit. In this case, the processor 21 controls the functions executed by the hardware circuit.

The ROM 22 is a nonvolatile memory in which a control program, control data, etc. are stored in advance. The ROM 22 is incorporated in the IC card 2 in the manufacturing stage in a state where the control program, control data, etc. are stored. That is, the control program and control data stored in the ROM 22 are incorporated in advance in accordance with the specifications of the IC card 2.

The RAM 23 is a volatile memory. The RAM 23 temporarily stores data, etc. that are being processed by the processor 21. For example, the RAM 23 functions as a calculation buffer, a reception buffer, and a transmission buffer. The calculation buffer temporarily holds results of various arithmetic processes executed by the processor 21. The reception buffer holds command data, etc. that are received from the reader/writer 11 via the communication unit 25. The transmission buffer holds a message (response data) or the like that is to be transmitted to the reader/writer 11 via the communication unit 25.

The NVM 24 is composed of a nonvolatile memory, such as a flash ROM, in which data can be written and rewritten. The NVM 24 stores a control program, an application and various data in accordance with how the IC card 2 is used. For example, the NVM 24 produces a program file, a data file, etc. A control program and various data are written in each of the produced files.

The communication unit 25 is an interface for transmitting/receiving data to/from the reader/writer 11. That is, the communication unit 25 is an interface for transmitting/receiving data to/from the host device 1 through the reader/writer 11.

Where the IC card 2 is realized as a contact type IC card, the communication unit 25 is composed of a communication control unit and a contact unit that are brought into physical and electrical contact with the reader/writer 11 to transmit and receive signals. For example, the IC card 2 is activated when it is supplied with operating power and an operating clock from the reader/writer 11 via the contact unit.

Where the IC card 2 is realized as a non-contact type IC card, the communication unit 25 is composed of a communication control unit, such as a modulation/demodulation circuit, and an antenna that are used for wireless communications with the reader/writer 11. For example, the IC card 2 receives radio waves from the reader/writer 11 via the antenna, the modulation/demodulation circuit, etc. The IC card 2 is activated when operating power and an operating clock are generated from the radio wave by a power supply unit (not shown).

The fingerprint sensor 27 acquires a fingerprint image from a user's finger. The fingerprint sensor 27 acquires a fingerprint image for generating a template. For example, the fingerprint sensor 27 includes a CCD sensor or the like. The fingerprint sensor 27 may be provided with a sensor or the like that detects a change in electric capacity. The fingerprint sensor 27 transmits a fingerprint image to the MPU 26.

The MPU 26 (Micro Processing Unit) processes the fingerprint image transmitted from the fingerprint sensor 27. The MPU 26 extracts feature point information (information indicating the coordinates and feature amounts of feature points) from the fingerprint image transmitted from the fingerprint sensor 27. The MPU 26 transmits the extracted feature point information to the processor 21.

Further, the MPU 26 performs a verification process for the fingerprint image transmitted from the fingerprint sensor 27. That is, the MPU 26 calculates a similarity between fingerprint images. The MPU 26 transmits the calculated similarity to the processor 21. It should be noted here that the similarity is an index indicating that the higher the similarity, the more alike the fingerprint images are.

For example, the MPU 26 extracts feature point information of each fingerprint image. The MPU 26 calculates a similarity between the extracted feature point information as the similarity between the fingerprint images according to a predetermined algorithm. The MPU 26 transmits the calculated similarity to the processor 21.

The MPU 26 performs a verification process between the template and the fingerprint image. For example, the MPU 26 may calculate a similarity between the template and the fingerprint image and transmit it to the processor 21.

The MPU 26 may transmit the success or failure of the verification to the processor 21.

The display unit 28 displays various information under the control of the processor 21. For example, the display unit 28 may be a light (e.g., an LED (Light Emitting Diode) light) that is lit under the control of the processor 21. The display unit 28 may be a display or the like.

Next, a description will be given of functions realized by the IC card 2. The functions realized by the IC card 2 are realized by causing the processor 21 to execute programs stored in the ROM 22, the NVM 24 or the like.

The processor 21 has a function of acquiring feature point information of each of fingerprint images acquired by the fingerprint sensor 27.

The plurality of fingerprint images are fingerprint images of the same finger. That is, the plurality of fingerprint images are fingerprint images showing the finger at different angles or at different positions.

It is assumed that the IC card 2 is set in the reader/writer 11 and is in a state where data can be transmitted/received to/from the host device 1.

The host device 1 transmits a command for registering a template to the IC card 2 through the reader/writer 11.

The processor 21 of the IC card 2 receives the command through the communication unit 25. Upon receiving the command, the processor 21 causes the fingerprint sensor 27 to acquire a fingerprint image. For example, the processor 21 activates the fingerprint sensor 27 through the MPU 26 or the like.

It is assumed here that the user places a predetermined finger on the fingerprint sensor 27.

The fingerprint sensor 27 acquires a fingerprint image from the predetermined finger of the user. The fingerprint sensor 27 transmits the acquired fingerprint image to the MPU 26.

The MPU 26 acquires the fingerprint image from the fingerprint sensor 27. The MPU 26 extracts feature point information from the acquired fingerprint image. The MPU 26 transmits the extracted feature point information to the processor 21.

The processor 21 acquires the feature point information of the fingerprint image from the MPU 26.

After the feature point information of the fingerprint image is acquired, the processor 21 repeats the above operation. By repeating the above operation, the processor 21 acquires feature point information of a plurality of fingerprint images The processor 21 has a function of determining whether the fingerprint image (second biometric information) which the fingerprint sensor 27 acquires this time matches the fingerprint image (first biometric information) which the fingerprint sensor 27 acquires in the past.

For example, the processor 21 determines whether the fingerprint image (second biometric information) acquired this time matches the fingerprint image (first biometric information) acquired immediately before.

First, the processor 21 causes the MPU 26 to calculate a similarity between the two fingerprint images. For example, the processor 21 supplies the fingerprint image acquired this time and the fingerprint image acquired immediately before to the MPU 26 to calculate the similarity. The processor 21 acquires the similarity calculated by the MPU 26.

After the similarity is acquired, the processor 21 determines whether the similarity exceeds a predetermined threshold value (first threshold value). Where the similarity exceeds the first threshold value, the processor 21 determines that the two fingerprint images match each other. Where the similarity is equal to or less than the first threshold value, the processor 21 determines that the two fingerprint images do not match each other.

Where the processor 21 determines that the two fingerprint images match each other (for example, where it determines that the two fingerprint images match each other with a high degree of similarity, i.e., with a first threshold value of 95% or more), the processor 21 has a function of outputting a signal indicating that the fingerprint image acquired this time is inappropriate for use as a fingerprint image for generating a template. The signal indicating that the fingerprint image acquired this time is inappropriate for use as a fingerprint image for generating the template need not be a signal directly indicating inappropriateness; it may be a signal indicating inappropriateness eventually or indirectly.

Where the processor 21 determines that the two fingerprint images match each other as described above, the processor 21 outputs a signal indicating that the fingerprint image acquired this time is inappropriate for use as the fingerprint image for generating the template (a signal indicating inappropriateness eventually or indirectly may be output). For example, the processor 21 transmits a response including that signal to the host device 1.

Further, the processor 21 causes the display unit 28 to display information indicating an error and prompting the user to change the finger placement. For example, where the display unit 28 is composed of LED lights, the processor 21 turns on or off a predetermined LED light or blinks it. Where the display unit 28 is composed of a display, the processor 21 may cause the display unit 28 to display a predetermined message.

Where the processor 21 determines that the two fingerprint images match each other as described above, the processor 21 does not use the feature point information of the fingerprint image acquired this time as feature point information for generating the template. The processor 21 may delete the feature point information of the fingerprint image acquired this time.

Where the processor 21 determines that the two fingerprint images do not match each other (for example, where it determines that the two fingerprint images do not match each other with a certain degree of similarity, i.e., with a first threshold value of 95% or less), the processor 21 uses the feature point information of the fingerprint image acquired this time as feature point information for generating a template, i.e., as one of samples in which the feature point information are appropriately dispersed. Further, the processor 21 may output information indicating that one fingerprint image has been successfully acquired. For example, the processor 21 causes the display unit 28 to display that information. For example, where the display unit 28 is composed of LED lights, the processor 21 turns on or off a predetermined LED light or blinks it. Where the display unit 28 is composed of a display, the processor 21 may cause the display unit 28 to display a predetermined message.

Where the similarity between the two fingerprint images is equal to or less than a second threshold value lower than the first threshold value (for example, where it is determined that the two fingerprint images match each other with a low degree of similarity, i.e., with a second threshold value of 60% or less), the processor 21 may output a signal indicating that the fingerprint image acquired this time is inappropriate for use as a fingerprint image for generating the template. The signal need not be a signal directly indicating inappropriateness but may be a signal indicating inappropriateness eventually or indirectly. For example, the processor 21 may determine that the user has placed another finger on the fingerprint sensor 27 and output error information prompting the user to place the same finger on the fingerprint sensor 27. In this case, the processor 21 does not use the feature point information of the fingerprint image acquired this time as the feature point information for generating the template. That is, where the similarity is between the first threshold value and the second threshold value, the processor 21 may use the feature point information of the fingerprint image acquired this time as the feature point information for generating the template.

The processor 21 has a function of generating a template, based on a plurality of feature point information.

The processor 21 counts the number of feature point information acquired to generate the template. That is, the processor 21 counts the number of feature point information of fingerprint images that do not match the fingerprint image acquired in the past.

Where that number reaches a predetermined threshold value, the processor 21 generates a template, based on the feature point information of a plurality of fingerprint images that do not match the fingerprint image acquired in the past, i.e., a plurality of fingerprint images acquired with some variations. That is, the processor 21 generates a template from a plurality of feature point information according to a predetermined algorithm. The processor 21 may generate a template from each of the plurality of feature point information.

After the template is generated, the processor 21 registers the generated template. For example, the processor 21 stores the generated template as authentication data in the MPU 26.

After the template is stored, the processor 21 transmits a response indicating that the registration of the template is completed to the host device 1 through the communication unit 25.

Next, a description will be given of an operation example of the IC card 2.

Figure 2:
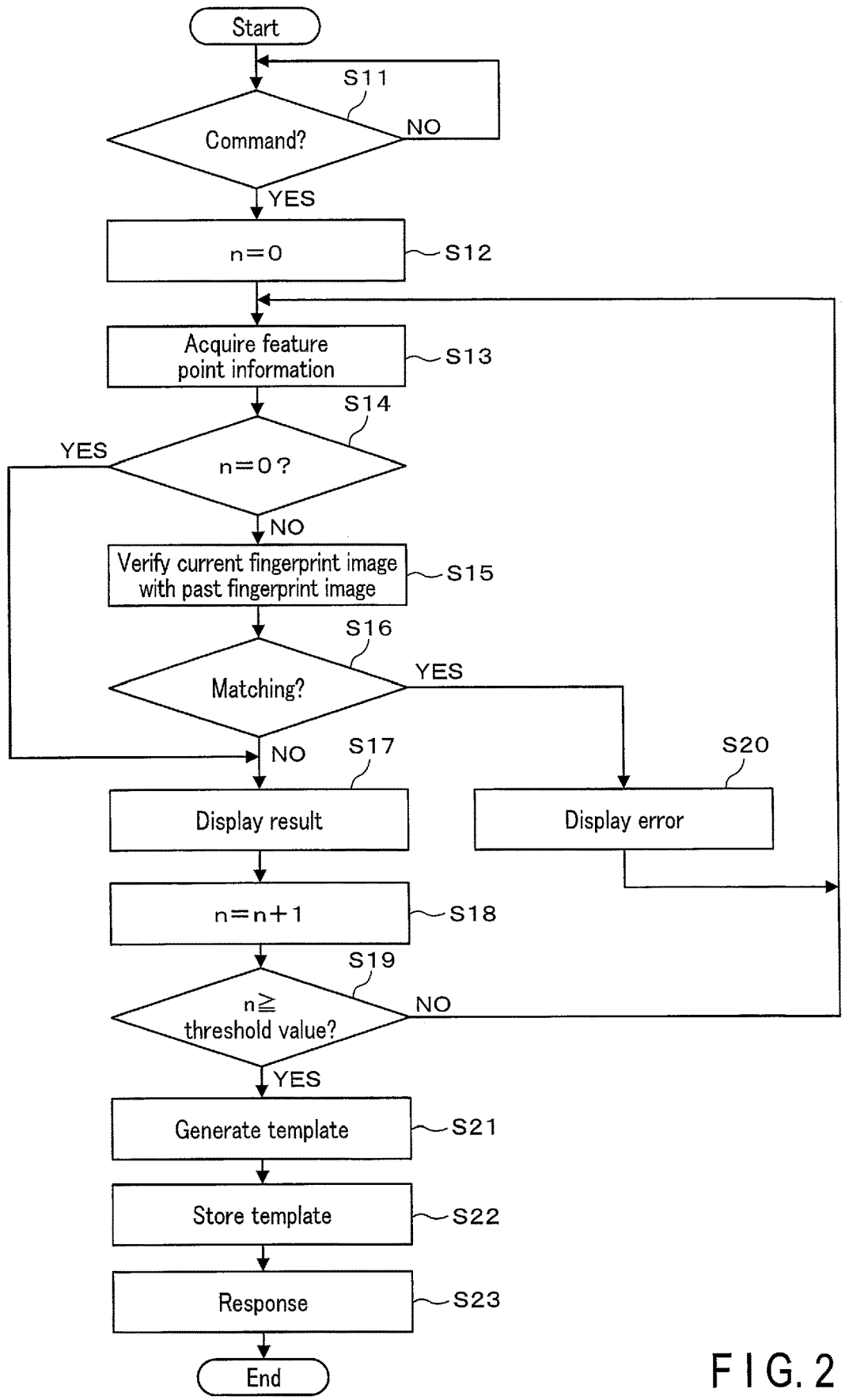
FIG. 2 is a flowchart illustrating an operation example of an IC card according to the first embodiment.

FIG. 2 is a flowchart illustrating the operation example of the IC card 2.

It is assumed here that the IC card 2 is set in the reader/writer 11 and is in a state where data can be transmitted/received to/from the host device 1.

First, the processor 21 of the IC card 2 determines whether or not a command for registering the template has been received from the host device 1 through the communication unit 25 (S11). Where it is determined that the command for registering the template has not been received from the host device 1 (S11, NO), the processor 21 returns to S11.

Where it is determined that the command for registering the template has been received from the host device 1 (S11, YES), the processor 21 resets the counter n that counts the number of feature point information for generating the template (n=0) (S12).

It is assumed here that the user places a predetermined finger on the fingerprint sensor 27.

Where the counter n is reset, the processor 21 acquires a fingerprint image by means of the fingerprint sensor 27, the MPU 26 and the like, and acquires feature point information of the fingerprint image (S13). After the feature point information is acquired, the processor 21 determines whether n is equal to 0 (S14).

Where it is determined that n is not equal to 0 (S14, NO), the processor 21 causes the MPU 26 to verify the fingerprint image acquired this time with the fingerprint image acquired in the past (S15). Where it is determined that n is equal to 0 (S14, YES) or where it is determined that the two fingerprint images do not match each other (S16, NO), the processor 21 causes the display unit 28 to display information indicating that one fingerprint image has been successfully acquired (S17).

After the information indicating that one fingerprint image has been successfully acquired is displayed on the display unit 28, the processor 21 increments n (S18). After n is incremented, the processor 21 determines whether n has reached a predetermined threshold value (S19).

For example, where it is determined that the two fingerprint images match each other because a high similarity rate is obtained (S16, YES), the processor 21 causes the display unit 28 to display an error (S20).

Where it is determined that n has not reached the predetermined threshold value (S19, NO) or where an error is displayed on the display unit 28 (S20), the processor 21 returns to S13.

Where it is determined that n has reached the predetermined threshold value (S19, YES), the processor 21 generates a template, based on n feature point information for generating the template (S21). After the template is generated, the processor 21 stores the generated template in the MPU 26 (S22).

After the generated template is stored in the MPU 26, the processor 21 transmits a response indicating that the registration of the template is completed to the host device 1 through the communication unit 25 (S23). After transmitting the response to the host device 1, the processor 21 ends the operation.

The processor 21 may determine whether the fingerprint image acquired this time matches each of the fingerprint images acquired in the past. Where one or more fingerprint images match the fingerprint image acquired this time, the processor 21 may output a signal indicating that the fingerprint image acquired this time is inappropriate for use as the fingerprint image for generating the template, such as a signal indicating an error.

Where one or more fingerprint images match the fingerprint image acquired this time, the processor 21 does not have to use the feature point information of the fingerprint image acquired this time as the feature point information for generating the template.

Further, the processor 21 may generate a template without being based on the feature point information.

For example, the processor 21 may generate a network obtained by machine learning using a plurality of fingerprint images and adopt such a network as a template. Further, the processor 21 may extract a pattern from a plurality of fingerprint images and generate information indicating that pattern as a template.

The template may be a plurality of fingerprint images that are determined as not matching the past fingerprint images.

What the template is and how it is generated are not limited to specific configurations.

The IC card 2 may be configured to acquire biometric information other than fingerprint images. For example, the IC card 2 may acquire an image of a vein, an iris or the like as biological information. The biometric information acquired by the IC card 2 is not limited to a specific configuration.

The processor 21 may realize the functions (or part of the functions) of the MPU 28. Further, the MPU 26 may realize part of the functions of the processor 21.

Where an acquired fingerprint image matches the fingerprint image acquired in the past, the IC card configured as described above cannot reflect an appropriate variation as a template, so that a signal indicating that the acquired fingerprint image is inappropriate for use as a fingerprint image for generating a template is output (the signal need not be a signal directly indicating inappropriateness but may be a signal indicating inappropriateness eventually or indirectly). Therefore, the IC card can prompt the user to change the placement of a finger when the user continuously inputs a fingerprint image without releasing the finger from the fingerprint sensor. In particular, in the case of a non-contact type IC card, where a plurality of fingerprints are successively collected, the fingerprint images tend to attain matching easily. Where the non-contact IC card is used for collecting fingerprints, it is relatively difficult to release a finger from the sensor once and then place the finger on the sensor again. As a result, matching fingerprint images are easily collected and the IC card is in an error state at that time, so that the IC card has an effective means for notifying the user of the error.

In order to detect whether the placement of a finger is changed, a conventional processor has to acquire a fingerprint image from the fingerprint sensor in real time and detect that the finger has been released from the fingerprint sensor.

On the other hand, the IC card according to the embodiment can acquire fingerprint images in which the finger is placed differently, without detecting that the finger is released from the fingerprint sensor by the above operation.

Therefore, the IC card can effectively acquire a plurality of biometric information for generating a template.

Second Embodiment

Next, a description will be given of an IC card processing system 100 according to the second embodiment.

The IC card 2 of the IC card processing system 100 of the second embodiment differs from the above-mentioned IC card 2 in that a response is transmitted to the host device 1 each time the feature point information of one fingerprint image is acquired. Accordingly, the other components will be denoted by the same reference symbols, and a detailed description of such components will be omitted.

Since the configurations of the host device 1 and the IC card 2 are similar to those of the first embodiment, the description thereof will be omitted.

The host device 1 transmits a command for acquiring one fingerprint image to generate a template to the IC card 2 through the reader/writer 11.

The host device 1 receives a response from the IC card 2 through the reader/writer 11, indicating that one fingerprint image has been successfully acquired. In this case, the host device 1 may cause a display unit or the like to display information indicating that one fingerprint image has been successfully acquired.

Further, the host device 1 receives a response from the IC card 2 through the reader/writer 11, indicating that the acquisition of one fingerprint image has failed. In this case, the host device 1 may cause the display unit or the like to display information indicating that the acquisition of one fingerprint image has failed. In addition, the host device 1 may cause the display unit or the like to display information prompting the user to change the finger placement.

Where the processor 21 of the IC card 2 receives a command to acquire one fingerprint image for generating a template, the processor 21 acquires a fingerprint image through the fingerprint sensor 27, the MPU 26 or the like, and acquires feature point information of the fingerprint image.

Where the fingerprint image acquired this time and the fingerprint image acquired in the past do not match each other, the processor 21 causes the communication unit 25 to transmit a response indicating that one fingerprint image has been successfully acquired to the host device 1. In this case, the processor 21 may output information indicating that one fingerprint image has been successfully acquired.

Where the fingerprint image acquired this time and the fingerprint image acquired in the past match each other, the processor 21 causes the communication unit 25 to transmit a response indicating that the acquisition of one fingerprint image has failed to the host device 1. In this case, the processor 21 may cause the display unit 28 to display information indicating an error and prompting the user to change the finger placement.

Next, a description will be given of an operation example of the IC card 2.

Figure 3:
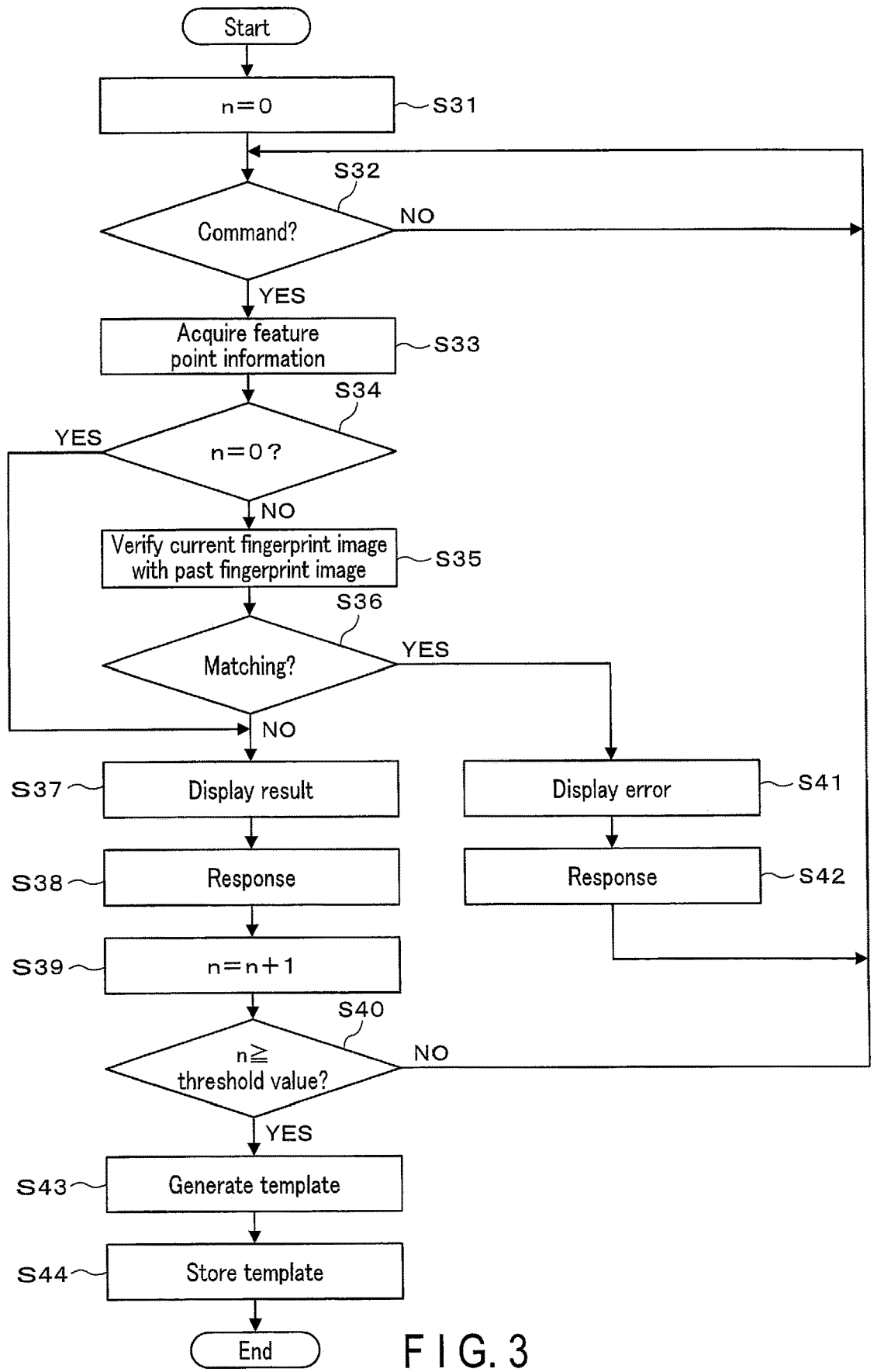
FIG. 3 is a flowchart illustrating another operation example of an IC card according to a second embodiment.

FIG. 3 is a flowchart illustrating the operation example of the IC card 2.

It is assumed here that the IC card 2 is set in the reader/writer 11 and is in a state where data can be transmitted/received to/from the host device 1.

First, the processor 21 of the IC card 2 resets the counter n (n=0) that counts the number of feature point information for generating a template (S31). After n is reset, the processor 21 determines whether or not a command for acquiring one fingerprint image to generate a template has been received from the host device 1 through the communication unit 25 (S32).

Where it is determined that the command for acquiring one fingerprint image to generate the template has not been received from the host device 1 (S32, NO), the processor 21 returns to S32.

Where it is determined that a command for acquiring one fingerprint image to generate the template has been received from the host device 1 (S32, YES), the processor 21 acquires the fingerprint image through the fingerprint sensor 27, the MPU 26, and the like, and acquires feature point information of the fingerprint image (S33). After the feature point information is acquired, the processor 21 determines whether n is equal to 0 (S34).

Where it is determined that n is not equal to 0 (S34, NO), the processor 21 causes the MPU 26 to verify the fingerprint image acquired this time with the fingerprint image acquired in the past (S35). Where it is determined that n is equal to 0 (S34, YES) or where it is determined that the two fingerprint images do not match each other (S36, NO), the processor 21 causes the display unit 28 to display information indicating that one fingerprint image has been successfully acquired (S37).

After the information indicating that one fingerprint image has been successfully acquired is displayed on the display unit 28, the processor 21 transmits a response indicating that one fingerprint image has been successfully acquired to the host device 1 through the communication unit 25 (S38).

After the response indicating that one fingerprint image has been successful acquired is transmitted to the host device 1, the processor 21 increments n (S39). After n is incremented, the processor 21 determines whether n has reached a predetermined threshold value (S40).

Where it is determined that the two fingerprint images match each other (S36, YES), the processor 21 causes the display unit 28 to display an error (S41). After the error is displayed on the display unit 28, the processor 21 transmits a response indicating that the acquisition of one fingerprint image has failed to the host device 1 through the communication unit 25 (S42).

Where it is determined that n has not reached a predetermined threshold value (S40, NO), or where a response indicating that the acquisition of one fingerprint image has failed is transmitted to the host device 1 (S42), the processor 21 returns to S32.

Where it is determined that n has reached the predetermined threshold value (S40, YES), the processor 21 generates a template, based on n feature point information for generating the template (S43). After the template is generated, the processor 21 stores the generated template in the MPU 26 (S44).

After the generated template is stored in the MPU 26, the processor 21 ends the operation.

After the template is stored in the MPU 26, the processor 21 may send a response indicating that the template registration has been completed to the host device 1 through the communication unit 25.

The communications between the IC card 2 and the host device 1 may be cut off each time the IC card 2 acquires a fingerprint image. That is, the user may separate the IC card 2 from the host device 1 each time the IC card 2 acquires a fingerprint image.

The IC card configured as above transmits a response to the host device each time a fingerprint image is acquired. Therefore, the host device can manage the acquisition status of fingerprint images. For example, where the IC card fails to acquire a fingerprint image, the host device can prompt the user to change the finger placement.

While certain embodiments have been described, these embodiments have been presented by way of example only, and are not intended to limit the scope of the embodiments. Indeed, the novel embodiments described herein may be embodied in a variety of other forms; furthermore, various omissions, substitutions and changes in the form of the embodiments described herein may be made without departing from the spirit. The accompanying claims and their equivalents are intended to cover such forms or modifications as would fall within the scope and spirit.

The invention claimed is:

1. A portable electronic device that executes a command from a host device, comprising:
    a sensor that acquires biometric information; and
    a processor configured to:
    cause the sensor to acquire first biometric information for generating a template used for authentication;
    cause the sensor to acquire second biometric information for generating the template after acquiring the first biometric information; and
    output a signal indicating that the second biometric information is not used as biometric information for generating the template when a similarity between the first biometric information and the second biometric information exceeds a first threshold value.

2. The portable electronic device according to claim 1, wherein the processor generates the template, based on the first biometric information and the second biometric information, when the similarity is equal to or less than the first threshold value.

3. The portable electronic device according to claim 1, further comprising:
    a display unit,
    wherein the processor causes the display unit to display an error when the similarity exceeds the first threshold value.

4. The portable electronic device according to claim 1, wherein the processor is further configured not to use the second biometric information for template generation when the similarity exceeds the first threshold value and when the similarity is lower than a second threshold value that is lower than the first threshold value.

5. The portable electronic device according to claim 1, further comprising:
    a communication unit that transmits/receives data to/from the host device,
    wherein the processor causes the communication unit to transmit a response indicating that acquisition of biometric information has failed to the host device, when the similarity exceeds the first threshold value.

6. The portable electronic device according to claim 1, wherein the biometric information is a fingerprint image.

7. A portable electronic device that executes a command from a host device, comprising:
    a module including a sensor that acquires biometric information, and a processor that causes the sensor to acquire first biometric information for generating a template used for authentication, that causes the sensor to acquire second biometric information used for generating the template, after the first biometric information is acquired, and that outputs a signal indicating that the second biometric information is not used as biometric information for generating the template when a similarity between the first biometric information and the second biometric information exceeds a first threshold value; and
    a casing incorporating the module.

8. The portable electronic device according to claim 7, wherein the processor generates the template, based on the first biometric information and the second biometric information, when the similarity is equal to or less than the first threshold value.

9. The portable electronic device according to claim 7, further comprising:
    a display unit,
    wherein the processor causes the display unit to display an error when the similarity exceeds the first threshold value.

10. The portable electronic device according to claim 7, wherein the processor is further configured not to use the second biometric information for template generation when the similarity exceeds the first threshold value and when the similarity is lower than a second threshold value that is lower than the first threshold value.

11. The portable electronic device according to claim 7, further comprising:
    a communication unit that transmits/receives data to/from the host device,
    wherein the processor causes the communication unit to transmit a response indicating that acquisition of biometric information has failed to the host device, when the similarity exceeds the first threshold value.

12. The portable electronic device according to claim 7, wherein the biometric information is a fingerprint image.

13. An IC card that executes a command from a host device, comprising:
    a sensor that acquires biometric information; and
    a processor configured to:
    cause the sensor to acquire first biometric information for generating a template used for authentication;
    cause the sensor to acquire second biometric information for generating the template, after acquiring the first biometric information; and
    output a signal indicating that the second biometric information is not used as biometric information for generating the template when a similarity between the first biometric information and the second biometric information exceeds a first threshold value.

14. The IC card according to claim 13, wherein the processor generates the template, based on the first biometric information and the second biometric information, when the similarity is equal to or less than the first threshold value.

15. The IC card according to claim 13, wherein the processor is further configured not to use the second biometric information for template generation when the similarity exceeds the first threshold value and when the similarity is lower than a second threshold value that is lower than the first threshold value.

16. The IC card according to claim 13, wherein the biometric information is a fingerprint image.

17. A program executed by a processor and causing the processor to realize:

a function in which a biometric acquiring sensor acquires first biometric information for generating a template used for authentication; and a function in which the sensor acquires second biometric information for generating the template, after acquiring the first biometric information; and a function in which a signal is generated indicating that the second biometric information is not used as biometric information for generating the template is output when a similarity between the first biometric information and the second biometric information exceeds a first threshold value.

18. The program executed by the processor according to claim 17, further comprising a function in which the template is generated, based on the first biometric information and the second biometric information, when the similarity is equal to or less than the first threshold value.

19. The program executed by the processor according to claim 17, further comprising a function in which the template is not generated from the second biometric information when the similarity exceeds the first threshold value and when the similarity is lower than a second threshold value that is lower than the first threshold value.

20. The program executed by the processor according to claim 17, wherein the biometric information is a fingerprint image.

* * * * *